UNITED STATES PATENT OFFICE.

JEAN JUSTIN ALBERT DE BRONAC AND AUGUSTIN JOSEPH MARTIAL DEHERRYPON, OF PARIS, FRANCE.

IMPROVEMENT IN TREATING METALLIC ORES WITH SPONGY IRON.

Specification forming part of Letters Patent No. 25,320, dated September 6, 1859.

*To all whom it may concern:*

Be it known that we, JEAN JUSTIN ALBERT DE BRONAC and AUGUSTIN JOSEPH MARTIAL DEHERRYPON, of Paris, in the Empire of France, civil engineers, have invented a new or improved process for treating metallic sulphurets, phosphurets, or arseniurets, antimoniurets, &c., and particularly sulphureted ores of lead, antimony, copper, silver, zinc, &c.; and we do hereby declare that the following is a full, clear, and exact description of the same.

Our invention rests mainly upon the energy displayed in the reactions of spongious iron, said spongious iron being the result of the reduction at a low temperature of the iron ores, (oxides, carbonates, hydrates.) The reduction of these ores having for object the separation of a gaseous body (oxygen) from a solid body, (iron,) the result thereof is that the latter remains at an extreme state of division, or, to speak more chemically, in the atomic state. In this state iron has an avidity of new combinations which common compact iron has not. These are the properties which we make use of in the treatment of sulphureted ores. Long since compact iron was employed in the treatment of galenas and sulphurets of antimony, acting therein as an agent of desulphuration, of reduction; but in this also its compactness is an obstacle to the rapidity of the reaction, its action being exerted only upon the surfaces in contact. The energetic qualities of spongious iron—that is to say, of iron in the *status nascens*—render it already far superior as a chemical agent, since in the treatment of galena, for instance, lead can, through it, be obtained at a temperature equal to that which is necessary to the formation of sulphuret of iron—that is to say, at a lower temperature than that which is required for the fusion of the gangues. In trade it should be preferred, on account of its low price and the great facility with which it can be pulverized, and therefore, whenever in metallurgy it may be necessary or useful to employ iron in fragments, spungic iron will ever prove preferable.

The avidity of spongious iron for new combinations, especially for sulphur, forms the basis of the present system, and has for actual consequences, first, the dispensing with previous roastings; second, the rapid extraction, at a low temperature, of certain metals from their sulphureted ores; third, a superior product to those obtained by the known processes; fourth, a notable saving in the expenses for the treatment.

We will proceed now to describe our process or method.

The following generalities are applicable to all metallic sulphurets, arseniurets, antimoniurets, &c. In the first place we pulverize the ore in a raw state, which is mixed afterward with a certain quantity of spongious iron equally pulverized. The amount of the sponge introduced is, in certain cases, calculated, so that the amount of the sulphur (arsenic, antimony, &c.,) contained in the ore be proportionate to that of the iron contained in the sponge in order to produce a sulphuret of iron. These quantities may vary according to the nature and species of ores. To prevent the spongious iron from being oxidized before its reacting on the sulphuret, (arseniuret, antimoniuret, &c.,) and to facilitate the union of the mixed substances, we compress the mixture into the shape and form of bricks, which bricks are also covered with a layer of coal in case they should be treated in a reverberatory furnace.

What has been just said is generally applicable to such ores as can be modified or reduced by iron. This capital point being once settled, we have now to speak of the principal ores which are treated by the present system.

*Lead.*—In the treatment of the galena the amount of iron sponge is to be calculated so as to transform the whole sulphur into sulphuret of iron. The mixture, compressed into bricks, is treated either in a vertical or a reverberatory furnace. The gangues being not to be scorified, it would be fruitless to raise the temperature above the degree required for the formation of the sulphuret of iron. The reduced lead is liquefied and abandons the gangue and sulphuret shell in which it was confined to run into a recipient intended to receive it. The particles of lead which might remain at the state of interposition into the cells of the said shell will be easily secured either after an eliquation in the cupola or after a pounding and washing of the said shells. Raw ores being desulphureted directly by iron, there can be formed neither oxides nor sulphates of lead, and consequently there can be no smoke or vapor of lead produced, and therefore no waste.

*Antimony.*—What has been said relating to lead can be applicable to antimony, save that in the treatment of the sulphuret of antimony care must be taken to introduce but a barely sufficient quantity of spongious iron, in order to remove all possibility of ferreous or iron-like antimony being formed. The result of the former operation is to yield the most part of metallic antimony in the pure state, besides a small amount of sulphuret of antimony mixed with some sulphuret of iron. This sulphuret of antimony is regained in the subsequent operation, in which the same proportions are to be observed. The difference of density existing between the metal and the mentioned sulphuret will of course effect such separation.

*Zinc.*—As the galena, the blende is pulverized and mixed with a sufficient quantity of spongious iron, (the whole being compressed;) so it is treated afterward in the same manner in which calamine is ordinarily treated to obtain zinc. In this operation, the sulphur of the blende being combined with the iron, the zinc made free is separated by way of volatilization.

*Copper.*—All the sulphurets of copper, whatever they may be, (pyritous, gray, black, &c., coppers,) are to be pulverized without previous roastings, the desulphuration of all the metals contained in the ores being to be effected by the presence of spongious iron. We add an amount of the said iron more than that which is strictly requisite for effecting the said desulphuration, which excess is intened to carry out the metals reduced. After the fusion, which can take place either in a vertical or a reverberatory furnace, a metallic residuum is found which consists of ferreous copper on one hand and of accidental metals on the other hand. This product, being pounded, is afterward roasted, which roasting is effected the more easily that it is merely intended to oxidize the iron and copper, and to volatilize, if need be, the other metals, (antimony, arsenic.) After the roasting, a fusion-bed is formed with excess of silica, and the mixture, being treated in a cupola or reverberatory furnace, yields a silicate of iron and some metallic copper.

*Unassigned metals.*—The same system stands good and applicable to all other sulphurets, phosphurets, arseniurets, antimoniurets, &c.

The novelty and economy of the means employed and of the results obtained by this our method over all the methods applied, and the results obtained thereby to this day, will be easily distinguished as, first, preventing roastings, which are often difficult, long, and expensive. Besides these considerations, which are merely economical, we shall further observe that the suppression of roastings will ever be a great improvement for the behalf of workmen; second, reducing the ores and extracting the metal much quicker than by the known processes.

We do not claim the invention of the treatment of metallic sponges by the process known as "Adrien Chenots'," or by any part of such process; but

What we claim as our invention, and desire to secure by Letters Patent, is—

The treatment of metallic sulphurets or other ores or metallic bodies with spongy iron, for purposes substantially as herein set forth, by the combination of the several processes herein specified, in the order stated, viz: first, pulverizing the ore and the spongy iron separately; secondly, mixing the two powders in definite proportions; thirdly, compressing the mixed powders into the form of cakes or small bricks, and, fourthly, treating the thus prepared ores in suitable furnaces, as herein described.

A. BRONAC.
MARTIAL DEHERRYPON.

Witnesses:
GEO. HUTTON,
F. GARDESSAT.